Feb. 6, 1923.

L. WILLIS ET AL

DUSTING MACHINE

Filed Sept. 1, 1920

Inventors,
Leland Willis,
Olin F. Woodworth,
by their Attorneys
Howson & Howson

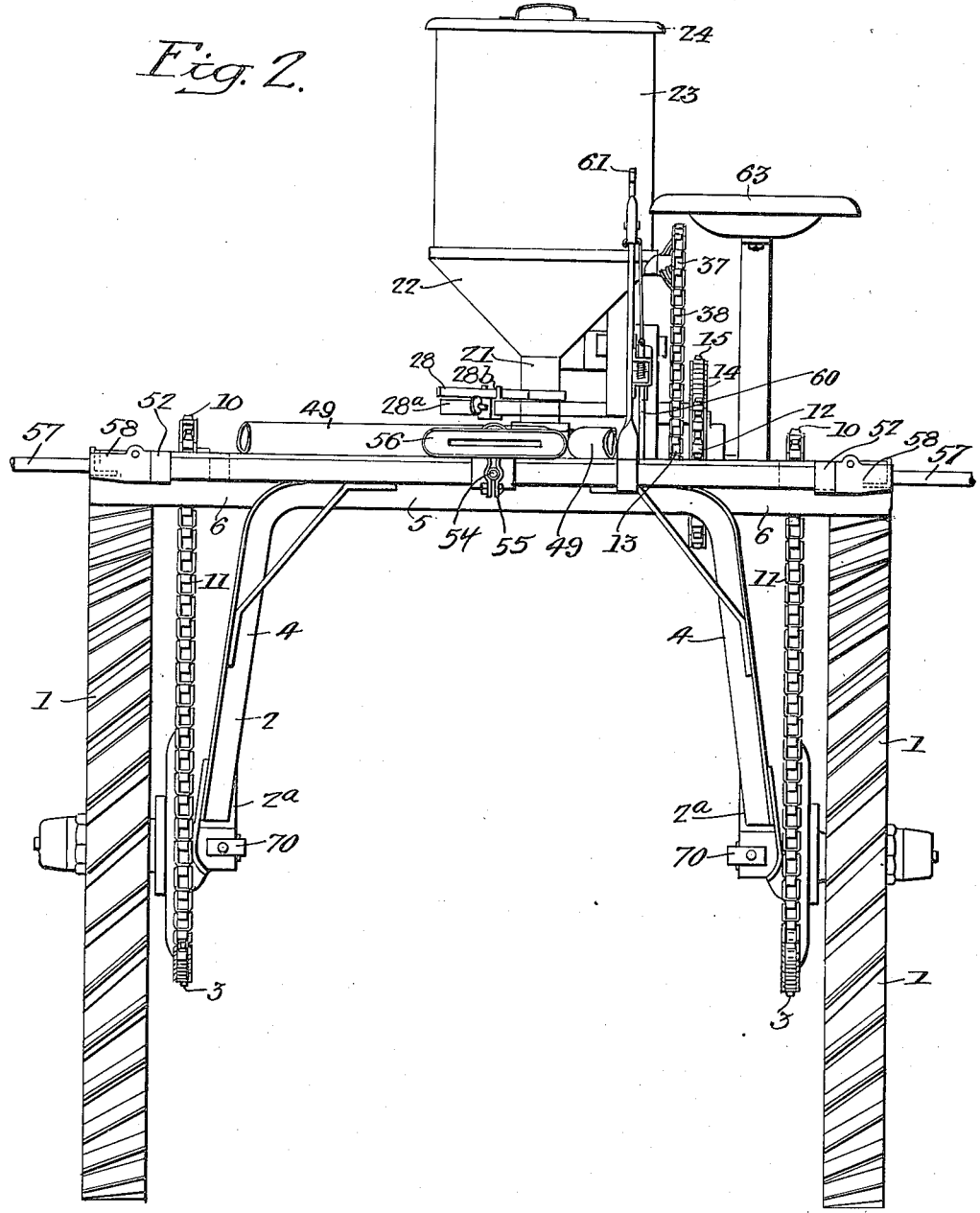

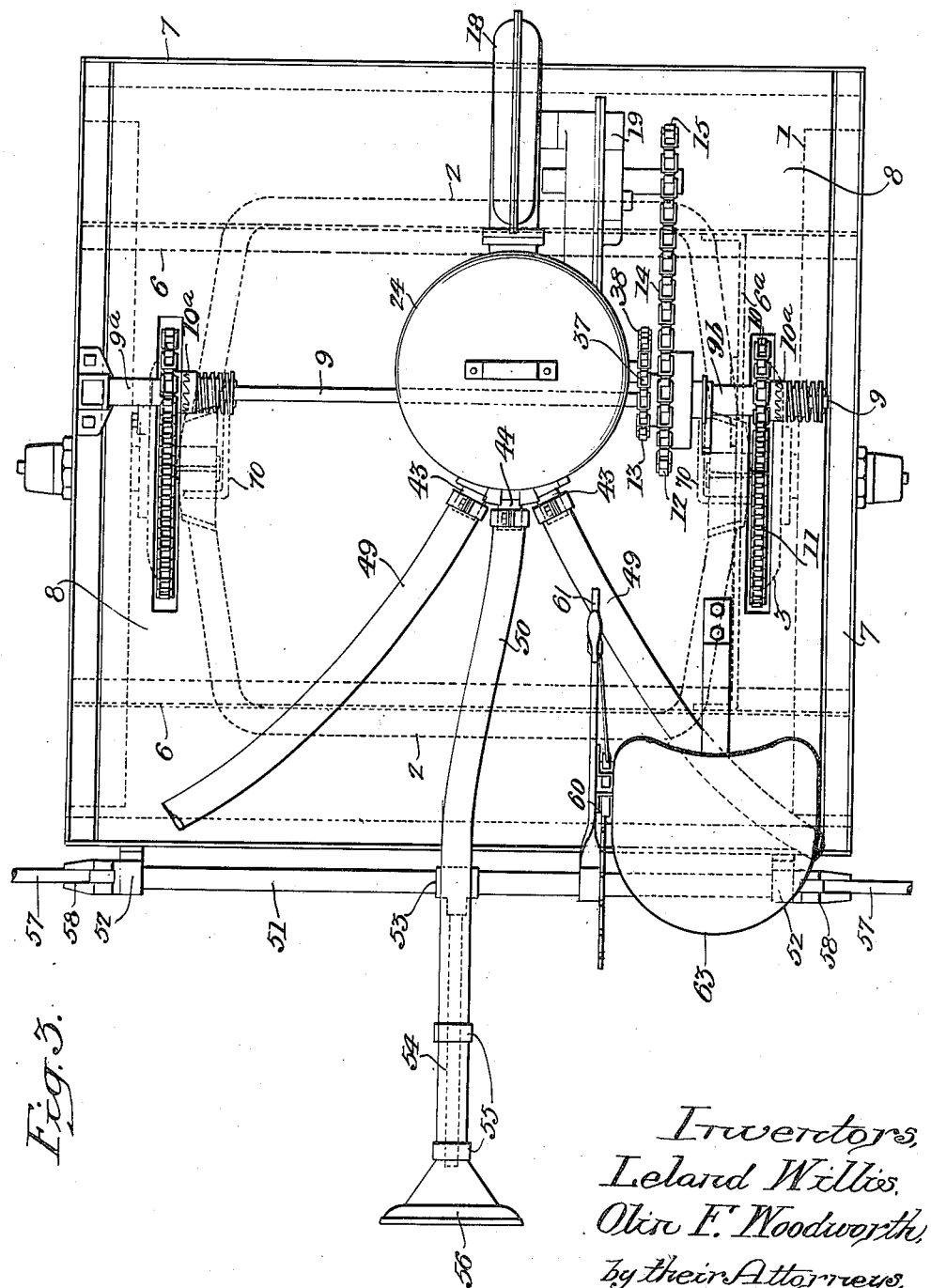

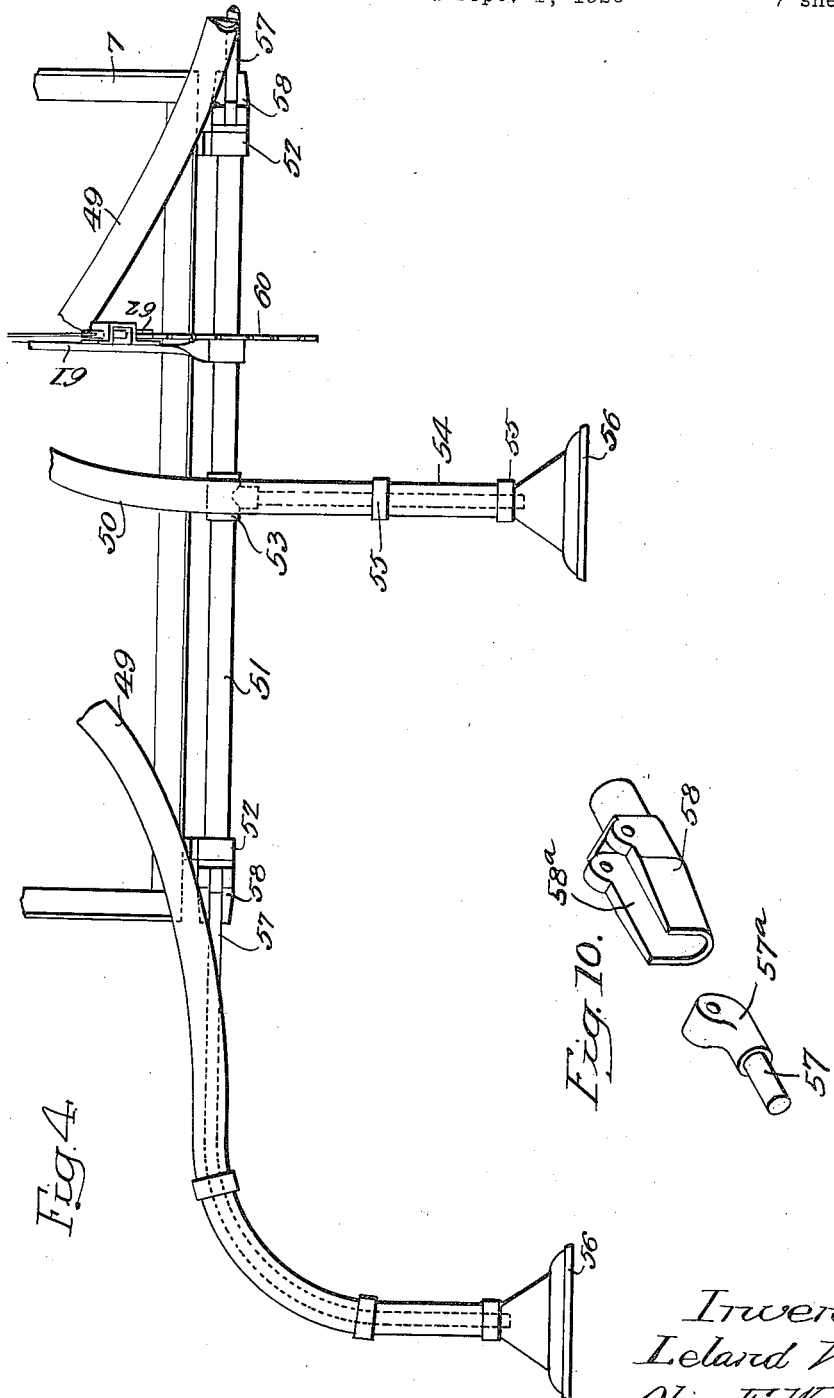

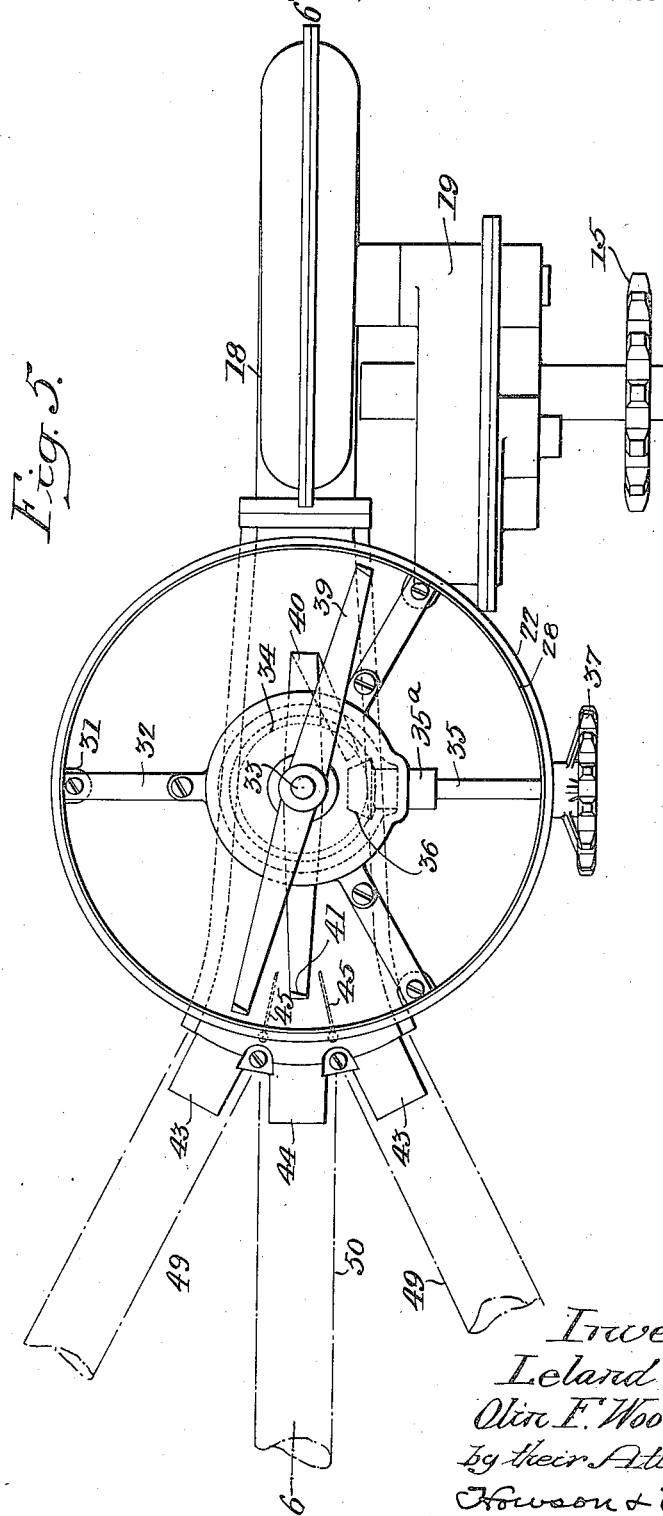

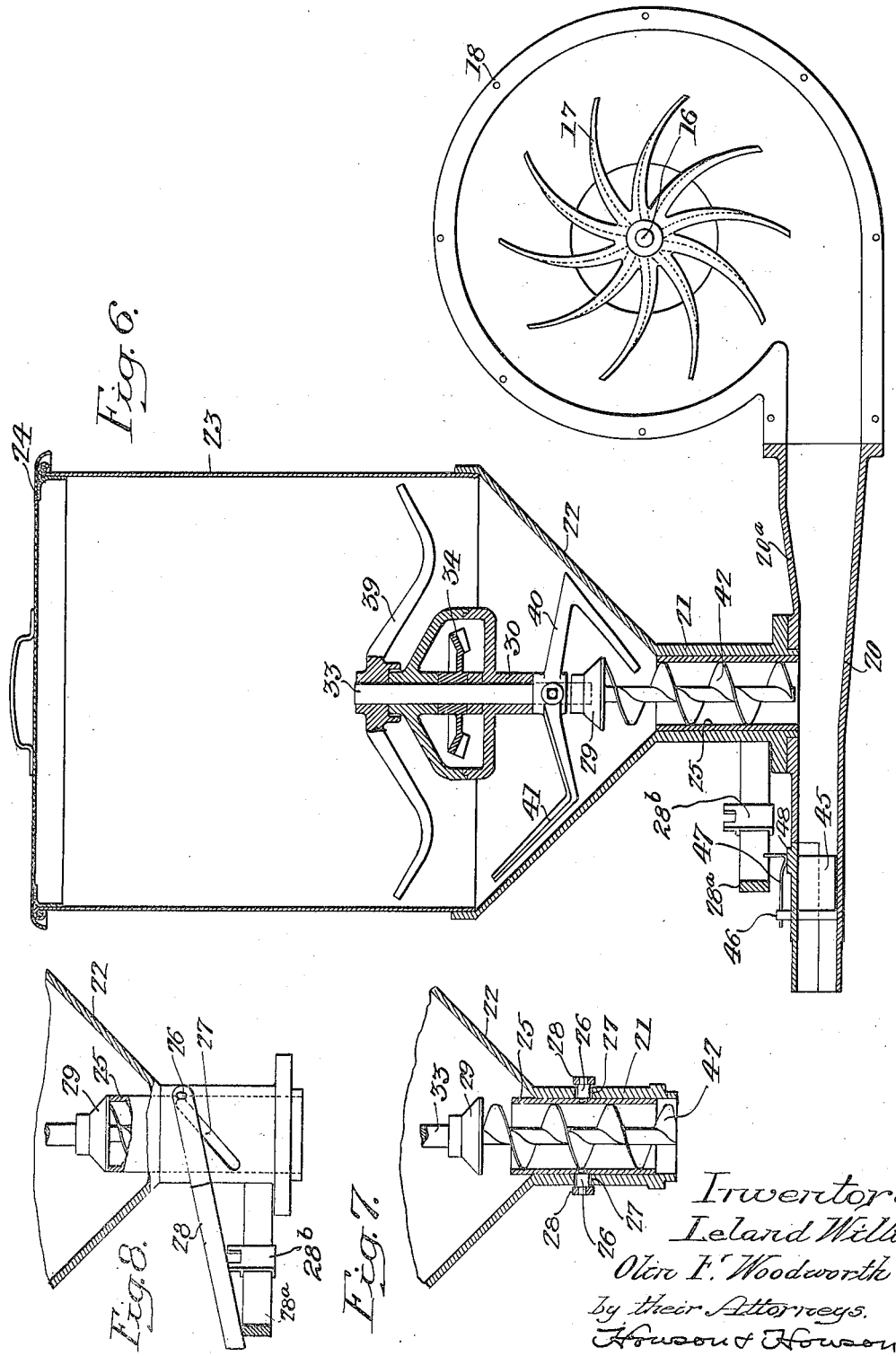

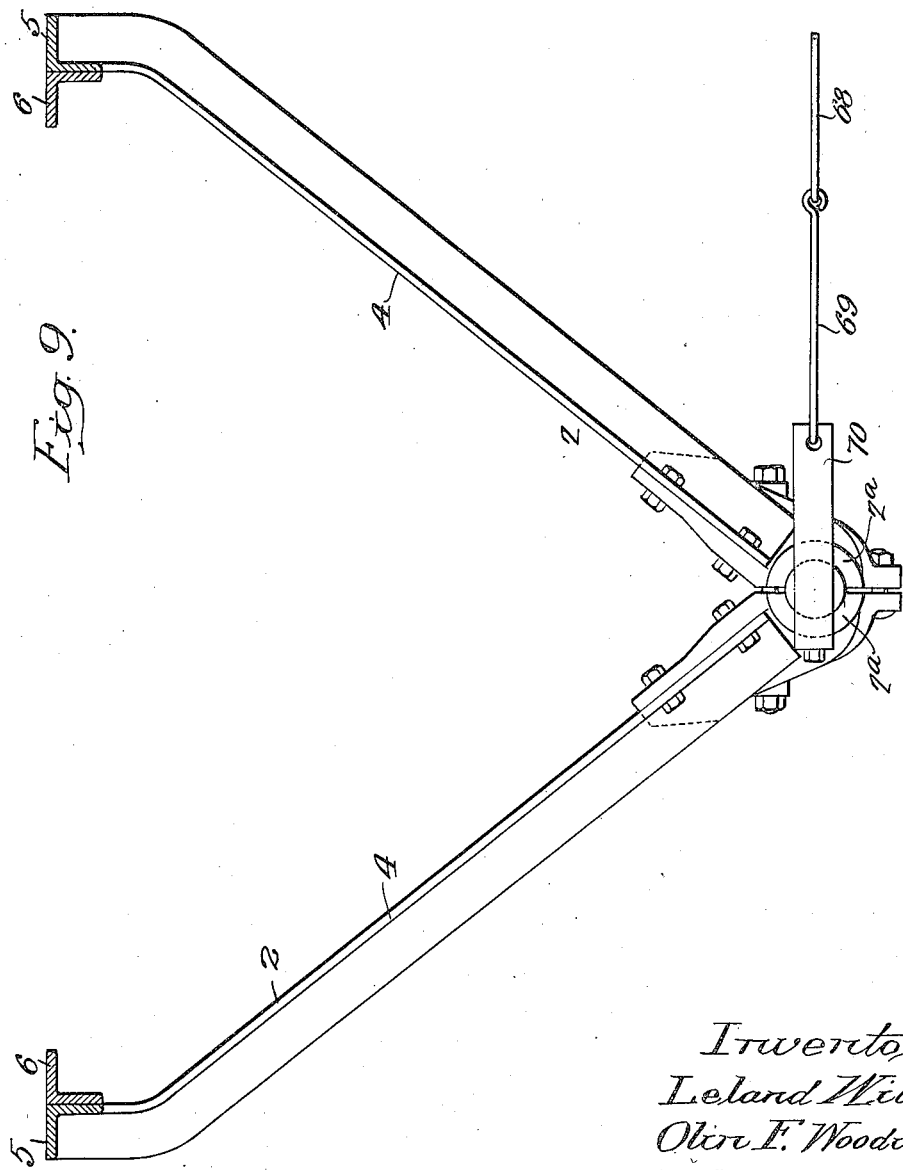

Patented Feb. 6, 1923.

1,444,648

UNITED STATES PATENT OFFICE.

LELAND WILLIS AND OLIN F. WOODWORTH, OF GRENLOCH, NEW JERSEY, ASSIGNORS TO BATEMAN AND COMPANIES INCORPORATED, OF WILMINGTON, DELAWARE, A CORPORATION OF DELAWARE.

DUSTING MACHINE.

Application filed September 1, 1920. Serial No. 407,528.

*To all whom it may concern:*

Be it known that we, LELAND WILLIS and OLIN F. WOODWORTH, citizens of the United States, residing in Grenloch, Camden County, New Jersey, have invented the Dusting Machine, of which the following is a specification.

This invention relates to that class of apparatus particularly designed for distributing chemical compounds upon vegetation, with a view to destroying injurious or objectionable insect life thereon and the present invention has to do more especially with a novel machine for applying calcium arsenate in powdered form to cotton plants, with a view to destroying the boll weevil, the cotton army worm and other insects.

One object of our invention is to provide a machine of the above noted type which shall include a novel frame construction particularly adapting it for the work to be performed; the invention further contemplating novel means for feeding powdered material at a definite and conveniently adjustable rate to a conduit through which it is delivered by a current of air to distributing nozzles.

It is further desired to provide a dusting machine including a source of air under pressure and a container for powdered material, with a novel arrangement and construction of pipes or conduits whereby the discharge of air into said container under certain conditions of operation, shall be effectually prevented; the invention also including relatively simple and conveniently adjustable means for varying the rate of feed of the powdered material.

These objects and other advantageous ends we attain as hereinafter set forth, reference being had to the accompanying drawings, in which, Figs. 1 and 2 are respectively a side and a rear elevation illustrating a dusting machine constructed in accordance with our invention;

Fig. 3 is a plan of the machine shown in Figs. 1 and 2, omitting the right and left distributing nozzles with their associated parts;

Fig. 4 is a plan of the center and one of the outer distributing nozzles with certain of their associated parts;

Fig. 5 is a plan on a larger scale than Figs. 1 to 4 inclusive, illustrating certain features of the construction of the blower and powder container, the top being removed;

Fig. 6 is a vertical section on the line 6—6, Fig. 5;

Fig. 7 is a vertical section of the lower part of the hopper, illustrating the powder feeding mechanism with the controlling valve therefor;

Fig. 8 is a side elevation, partly in vertical section, further illustrating the structure shown in Fig. 7;

Fig. 9 is an elevation partly in section illustrating the detail construction of a portion of the supporting frame of our machine; and Fig. 10 is a detached perspective view of the hinge connection between one of the side booms and its supporting shaft.

Figure 1:
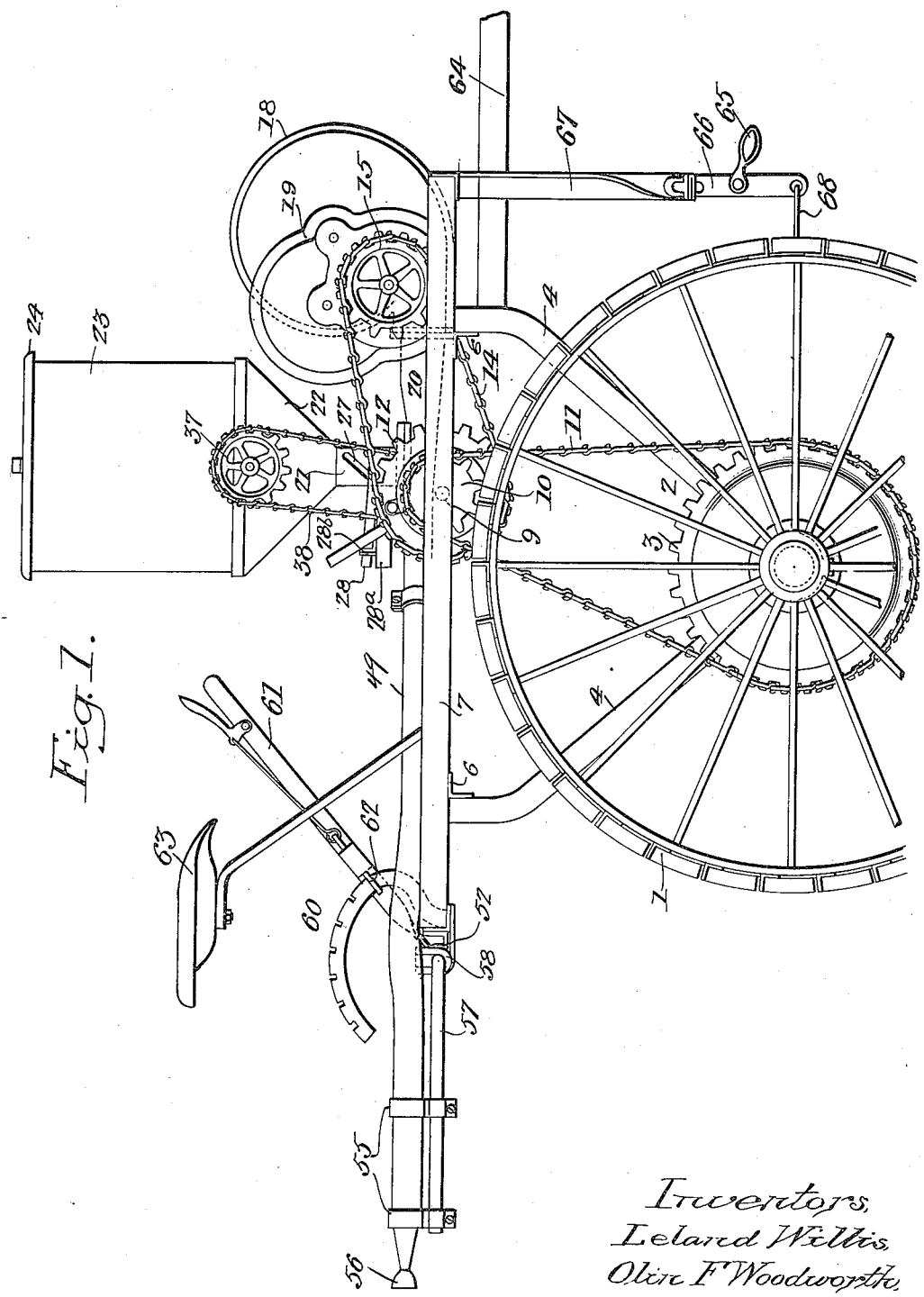

In the above drawings 1 represents two supporting wheels rotatably mounted upon short axles projecting outwardly from the side portions of a frame structure 2 and each having rigidly fixed to it a sprocket wheel 3. The inner end of each axle is rigidly clamped between a pair of suitably formed castings $2^a$ (Fig. 9) bolted or otherwise attached to the ends of rolled structural frame sections 2,—in the present case angle irons,—each having an approximately U-shaped form, and said frames are so constructed that the sides or branches 4 of these frame members extend at an angle to the branches 4 of the other, the angle being slightly less than 90 degrees.

The middle portions 5 of these frame sections are parallel and are so bent or formed that the top flange of each lies in a common plane. Bolted, welded, or otherwise rigidly fixed to the side flange of each middle section 5 is a straight length of angle section 6, extending transversely of the machine and likewise having a flange in the plane of the top flanges of the frame members 2, beyond which its ends project to a point in or adjacent the plane of the outsides of the wheels 1.

Upon these end portions of the frame members 6 is fixed a rectangular platform structure, preferably consisting of a marginal frame 7 of rolled sections and a wooden floor 8. This marginal frame provides or supports a bearing $9^a$ supported by the frame 7 for one end of a transversely extending shaft 9 whose second end is carried in a bearing 9$^b$ supported on a bar 6$^a$ extending between the two frame sections. This shaft has loosely mounted on it two sprocket wheels 10 connected by chains 11 to the sprocket wheels 3, and has fixed to it two other sprocket wheels 12 and 13. Said sprockets 10 are normally connected to the shaft through spring actuated tooth clutches 10$^a$ so that they may reverse their direction of rotation without turning the shaft backward. The sprocket 12 through a chain 14, is operatively connected to a sprocket wheel 15, which through encased gearing whose detail construction forms no part of the present invention, is operatively connected to a shaft 16 carrying the rotor 17 of a blower or fan 18.

The casing 18 for the said blower with the casing 19 for the gearing connecting the fan rotor with the sprocket 15, are suitably mounted on the platform 8 and the outlet of said blower is connected to a nozzle conduit 20 projecting rearwardly in the central plane of the machine. This nozzle conduit which is suitably fixed to the platform, has opening into its upper side a vertically extending cylindrical delivery pipe 21 leading from the hopper bottom 22 of a powder container 23 having a conveniently removable cover 24.

Said pipe 21 is preferably flanged at its lower end for connection with the nozzle structure 20 and has vertically slidable and rotatable within it a cylindrical valve sleeve 25, to which are connected two oppositely placed, outwardly extending pins 26 movable in oppositely inclined cam slots 27 formed in the side of this pipe. The outer ends of said pins are connected to the branches of a forked operating lever 28 and the arrangement is such that the swinging of this lever around the conduit in one direction or the other will rotate the sleeve and by reason of the coaction of the pins 26 with the sides of the slots 27, at the same time cause it to move longitudinally so as to vary the distance of its upper end from the lower edge of a flaring collar 29 supported as hereafter noted within the hopper bottom 22 at a fixed distance above the upper end of the pipe 21. A semi-annular bar 28$^a$ is fixed to this pipe 21 and has adjustably clamped to it a notched block 28$^b$ whereby the lever 28 with its connected sleeve 25 may be retained in any given position.

The parts are so arranged that when the lever 28 is moved to one of its extreme positions, the upper end of the sleeve 25 occupies the position shown in Fig. 6, where its upper end is practically flush with the upper end of said conduit 21, so that there is a maximum opening into it from the hopper bottom 22 of the container.

Within the lower part of said container 23 we provide a bearing and casing structure 30 supported through arms 32 from lugs 31 projecting inwardly from the upper part of the hopper bottom 22. This structure 30 supports a vertical shaft 33 and preferably includes a casing enclosing a bevelled gear 34 fixed to said shaft, also providing a bearing 35$^a$ for a horizontal shaft 35. The latter has fixed to it within said casing a bevelled pinion 36 in mesh with the gear 34 and extends radially outward through the lower part of the container 23, having fixed to its outer extremity a sprocket wheel 37 connected through a chain 38 with the sprocket 13 on the main shaft 9.

The upper end of the vertical shaft 33, which extends centrally within the container 23, has fixed to it a pair of oppositely projecting, downwardly bent arms 39 serving as agitators for the material in the lower part of the body of the container 23.

Immediately below the casing and bearing structure 30 there is also fixed to the shaft 33 a second pair of agitating arms 40—41, the first of which consists of two parts at an acute angle projecting downwardly and laterally offset so that one part is movable adjacent to and substantially parallel with the lower part of the sloping hopper bottom 22, while the other arm 41 consists of two parts bent at an obtuse angle, of which the second or outer part extends upwardly and substantially parallel with the upper part of the wall of the hopper bottom.

Immediately below the flaring collar 29 there is fixed on the vertical shaft 33 a helical or screw conveyor 42 designed to carry the material from the lower part of the hopper bottom 22 into the nozzle structure 20. Said nozzle structure as shown in Fig. 5, consists of a conduit which increases in width from the blower 18 to its three outlets 43—44—43 while as shown in Fig. 6, it decreases in height from the blower casing to a point in advance of the pipe 21 from whence its height as illustrated remains substantially constant to its outlets.

In order to regulate the amount of material passing into the outlets, we provide two dampers or valves 45 in the form of vertically pivoted plates whose pivot spindles 46 project above the nozzle structure and have fixed to them spring arms 47 coacting with a toothed or notched portion 48 of said nozzle structure. Each of said side nozzle structures 43 has connected to it one end of a conduit 49, preferably although not necessarily of rubber or other flexible material, while a similar conduit 50 is connected to a central outlet 44. On the rear part of the platform of the machine there are provided bearings 52 for a transversely extending oscillatory shaft 51, preferably made of tubular material and having fixed to or included in its central portion, a fitting 53 carrying a rearwardly projecting arm 54. The delivery conduit 50 projects over this arm or boom to which its outer end is held by clamps 55 and there is fixed to the rear extremity of said conduit a dust or powder distributing nozzle 56.

Each end of the spindle 51 has hinged to it an outwardly and rearwardly curved arm or boom 57, for which purpose it has an elongated head 58 formed with an upwardly opening slot 58ª for the reception of the head 57ª of said boom. This head 57ª is pivoted in the head 58 so as to be normally maintained in line with said spindle. The outer portion of the flexible conduit 49, is clamped to said boom and terminates in a distributing nozzle 56. Each of the hinge connections 58 between the shaft 51 and arms 57 is so made that the latter with their attached conduits may be swung upwardly and inwardly, although they are supported by the hinges against rearward or forward movement so that the two outer distributing nozzles under operating conditions are carried transversely in line with the central nozzle, but considerably to one side or the other of the machine, beyond its wheels. When the machine is not in operation, it is possible to swing these outer conduits with their nozzles and supporting booms, inwardly toward each other so that the machine may be moved without danger of injury to these parts.

For maintaining the distributing nozzles 56 at any desired height above the ground, we mount on the rear of the platform a notched quadrant 60, and fix to the shaft 51 a lever arm 61 carrying a hand operated dog 62 in position to cooperate with the notches of said quadrant. Also mounted on the platform is an operator's seat 63 and a suitable tongue 64 is attached to the front portion of the machine for draft purposes. Two singletrees 65 are respectively connected to links 66, each of which is hung from an outwardly and downwardly projecting angle section 67 carried by the forward portion of the platform frame 7, while its lower end is connected through a pair of links 69 with a bar 70 attached to one of the castings 3.

Under conditions of operation the motion of the vehicle and the resulting rotation of the wheels causes the rotor 17 of the blower to be turned at a high rate of speed through the sprocket chain 11, sprocket wheel 10 and 12 and chain 14, so that a current of air is delivered at high velocity through the nozzle structure 20. At the same time through the chain 38 and sprockets 13 and 37 power is transmitted from the shaft 9 to the shaft 35 and through gears 36 and 34, to the vertical shaft 33 within the container, which it will be understood has been filled with the powder to be applied by the machine. Such powder is agitated by the two sets of arms 39 and 40—41 and is delivered at the desired rate through the conduit 21 into the nozzle structure 20 by the feed screw 42,—the rate of feed being determined not only by the speed of this screw but also by the position of the sleeve 25 which may be adjusted toward and from the collar 29 as above described.

The air current passing through the nozzle structures 20 carries the powdered material delivered to it through the three discharge nozzles 56, from which it is delivered in the form of a more or less dense cloud, and the relative amounts delivered from each nozzle are determined by the adjustment of the valves or dampers 45.

By forming the conduit 20 as shown in Fig. 6, with a deflecting portion 20ª in advance of the powder delivery pipe 21, the air flowing to the nozzles is prevented from passing up this pipe since it is directed downwardly and away from the lower end of said pipe and permits an even feed of the powder to the nozzles.

We claim:

1. The combination in a dusting machine of a container having an outlet pipe; a delivery conduit connected to said pipe; a source of air under pressure connected to said delivery conduit; a vertically adjustable sleeve in the outlet pipe; with a relatively fixed structure above said sleeve coacting therewith to vary the delivery of powdered material from the container.

2. The combination in a dusting machine of a container having an outlet pipe; a delivery conduit connected to said pipe; a source of air under pressure connected to the pipe; means including a vertically movable and rotatable sleeve in the outlet pipe for varying the delivery of powdered material thereto; with a fixed collar mounted to coact with the upper end of said sleeve to regulate the flow of material from the container.

3. The combination in a dusting machine of a container having an outlet pipe; a helical conveyor in said pipe; means including a shaft for driving said conveyor; a collar on said shaft; a vertically adjustable sleeve operative in the outlet pipe and movable toward and from the collar; with means for rotating and vertically moving said sleeve at will to adjust the feed into said pipe.

4. The combination in a dusting machine of a container having a bottom outlet; a pipe connected to the outlet and provided with inclined slots; a conduit connected to receive material from said pipe; a sleeve vertically adjustable in the outlet pipe; outwardly extending members fixed to said sleeve and operative in the inclined slots of the outlet pipe; with means engaging said members for adjusting the sleeve to regulate the flow therein.

5. The combination in a dusting machine of a container having a hopper bottom and an outlet pipe connected thereto; an operating shaft extending vertically through the pipe into the container; a helical conveyor on the shaft within the pipe; a collar on the shaft adjacent the outlet pipe, a vertically movable and rotatable sleeve in the outlet pipe coacting with the collar to regulate the flow of material from the container; with means for moving said sleeve toward or from said collar at will to vary the amount of material passing into the outlet pipe.

LELAND WILLIS.
OLIN F. WOODWORTH.